(12) United States Patent
Lim et al.

(10) Patent No.: US 8,810,602 B2
(45) Date of Patent: Aug. 19, 2014

(54) IMAGE PROCESSING APPARATUS, MEDIUM, AND METHOD

(75) Inventors: Hwa Sup Lim, Hwaseong-si (KR); Byong Min Kang, Yongin-si (KR); Seong Jin Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 558 days.

(21) Appl. No.: 12/755,615

(22) Filed: Apr. 7, 2010

(65) Prior Publication Data

US 2010/0309201 A1 Dec. 9, 2010

(30) Foreign Application Priority Data

Jun. 9, 2009 (KR) .................. 10-2009-0050877

(51) Int. Cl.
*G06T 15/00* (2011.01)
*G06G 5/00* (2006.01)

(52) U.S. Cl.
USPC .......................................... 345/639; 345/419

(58) Field of Classification Search
None
See application file for complete search history.

(56) References Cited

U.S. PATENT DOCUMENTS

2010/0302365 A1* 12/2010 Finocchio et al. ............ 348/142
2011/0273529 A1* 11/2011 Lai et al. ......................... 348/42

FOREIGN PATENT DOCUMENTS

| JP | 2004-28874 | 1/2004 |
|---|---|---|
| KR | 10-2007-0117937 | 12/2007 |
| KR | 10-2007-0121440 | 12/2007 |
| KR | 10-2008-0046015 | 5/2008 |
| KR | 10-2008-0083999 | 9/2008 |
| KR | 10-2008-0102826 | 11/2008 |
| WO | 2005/034035 | 4/2005 |

OTHER PUBLICATIONS

Eric P. Bennett et al., "Video Enhancement Using Per-Pixel Virtual Exposures", ACM Transactions on Graphics, ACM, US, Jan. 1, 2005, pp. 845-852.
Buades et al., "Denoising image sequences does not require motion estimation", Preprint of the CMLA, May 2005.
Antoniog Dopico et al., "Distributed Computation of Optical Flow", May 13, 2004, Computational Science-ICCS 2004, pp. 380-387.
European Search Report dated Sep. 20, 2010 issued in corresponding European Patent Application 10165286.5.
Japanese Office Action issued Feb. 12, 2014 in corresponding Japanese Patent Application 2010-132165.

* cited by examiner

*Primary Examiner* — Xiao Wu
*Assistant Examiner* — Yingchun He
(74) *Attorney, Agent, or Firm* — Staas & Halsey LLP

(57) ABSTRACT

Provided is an image processing apparatus, medium, and method. The image processing apparatus may include a first calculator and a second calculator. The first calculator may calculate a first weight of a first frame depth value of a first pixel of a depth image and a second weight of a second frame depth value of the first pixel, based on an obtainment time difference between the first frame depth value of the first pixel and the second frame depth value of the first pixel among a plurality of frame depth values of the first pixel. The second calculator may determine a corrected first frame depth value of the first pixel using a linear sum that is calculated by applying the first weight to the first frame depth value of the first pixel, and by applying the second weight to the second frame depth value of the first pixel.

24 Claims, 7 Drawing Sheets

IMAGE PROCESSING APPARATUS, MEDIUM, AND METHOD

CROSS-REFERENCE TO RELATED APPLICATIONS

This application claims the benefit of Korean Patent Application No. 10-2009-0050877, filed on Jun. 9, 2009, in the Korean Intellectual Property Office, the disclosure of which is incorporated herein by reference.

BACKGROUND

1. Field

One or more embodiments relate to an image processing apparatus and method that may remove noise of a depth camera used for obtaining a depth image, and provide the depth image with the decreased noise.

2. Description of the Related Art

Currently, information about a three-dimensional (3D) image is widely used in a variety of applications. Generally, a 3D image includes geometry information and color information. The color information may be obtained using a camera that employs a charged coupled device (CCD) or a complementary metal-oxide semiconductor (CMOS) sensor. The geometry information may be obtained using a depth camera.

The depth camera may generate a depth image by emitting light such as an infrared (IR) light to an object, sensing a reflection ray using a sensor, and measuring a Time of Flight (TOF) that is the time taken for an emitted ray to be reflected from the object.

A depth sensor used for the depth camera of the TOF may be easily affected by electrical and/or thermal noise of the depth sensor and by a characteristic of a surrounding light source and material. Therefore, depth values of the depth image generated by the depth camera may be affected by the noise. The noise may deteriorate a quality of 3D modeling.

The noise may be removed using various types of schemes. According to an existing scheme, the noise may be removed by calculating the average of depth images that are obtained by performing a plurality of measurements for the same object.

The existing scheme may have a relatively excellent characteristic for a static object, whereas the existing scheme may cause a distortion, for example, motion blurring, for a dynamic object

SUMMARY

According to an aspect of one or more embodiments, there may be provided an image processing apparatus, including a first calculator to calculate a first weight of a first frame depth value of a first pixel of a depth image and a second weight of a second frame depth value of the first pixel, based on an obtainment time difference between the first frame depth value of the first pixel and the second frame depth value of the first pixel, the first frame depth value of the first pixel and the second frame depth value of the first pixel being among a plurality of frame depth values of the first pixel, and a second calculator to determine a corrected first frame depth value of the first pixel using a linear sum that is calculated by applying the first weight to the first frame depth value of the first pixel, and by applying the second weight to the second frame depth value of the first pixel.

As the obtainment time difference becomes greater, the first calculator may adjust a difference between the first weight and the second weight to be greater.

As the obtainment time difference becomes greater, the first calculator may adjust a ratio of the second weight to the first weight to be smaller.

As the obtainment time difference becomes greater, the first calculator may adjust the ratio of the second weight to the first weight to be smaller along a Gaussian curve distribution.

The image processing apparatus may further include a third calculator to readjust the calculated first weight and the second weight based on a difference between the first frame depth value of the first pixel and the second frame depth value of the first pixel.

The second calculator may determine the corrected first frame depth value of the first pixel using a linear value that is calculated by applying the readjusted first weight to the first frame depth value of the first pixel, and by applying the readjusted second weight to the second frame depth value of the first pixel.

As a depth value difference becomes greater, the second calculator may adjust a difference between the first weight and the second weight to be greater.

As the difference between the first frame depth value of the first pixel and the second frame depth value of the first pixel becomes greater, the third calculator may readjust a ratio of the second weight to the first weight to be smaller.

As the difference between the first frame depth value of the first pixel and the second frame depth value of the first pixel becomes greater, the third calculator may readjust the ratio of the second weight to the first weight to be smaller along a Gaussian curve distribution.

According to another aspect of one or more embodiments, there may be provided an image processing apparatus, including a first calculator to calculate a first weight of a first frame depth value of a first pixel of a depth image and a second weight of a second frame depth value of the first pixel, based on a difference between the first frame depth value of the first pixel and the second frame depth value of the first pixel, the first frame depth value of the first pixel and the second frame depth value of the first pixel being among a plurality of frame depth values of the first pixel, and a second calculator to determine a corrected first frame depth value of the first pixel using a linear sum that is calculated by applying the first weight to the first frame depth value of the first pixel, and by applying the second weight to the second frame depth value of the first pixel.

As a depth value difference becomes greater, the first calculator may adjust a difference between the first weight and the second weight to be greater.

As the difference between the first frame depth value of the first pixel and the second frame depth value of the first pixel becomes greater, the first calculator may adjust a ratio of the second weight to the first weight to be smaller.

As the difference between the first frame depth value of the first pixel and the second frame depth value of the first pixel becomes greater, the first calculator may adjust the ratio of the second weight to the first weight to be smaller along a Gaussian curve distribution.

According to still another aspect of one or more embodiments, there may be provided an image processing method, including calculating a first weight of a first frame depth value of a first pixel of a depth image and a second weight of a second frame depth value of the first pixel, based on an obtainment time difference between the first frame depth value of the first pixel and the second frame depth value of the first pixel, the first frame depth value of the first pixel and the second frame depth value of the first pixel being among a plurality of frame depth values of the first pixel, and determining a corrected first frame depth value of the first pixel using a linear sum that is calculated by applying the first weight to the first frame depth value of the first pixel, and by applying the second weight to the second frame depth value of the first pixel.

As the obtainment time difference becomes greater, the ratio of the second weight to the first weight may be adjusted to be smaller, and further, to be smaller along a Gaussian curve distribution.

The image processing method may further include readjusting the calculated first weight and the second weight based on a difference between the first frame depth value of the first pixel and the second frame depth value of the first pixel.

The determining of the corrected first frame depth value may include determining the corrected first frame depth value of the first pixel using a linear value that is calculated by applying the readjusted first weight to the first frame depth value of the first pixel, and by applying the readjusted second weight to the second frame depth value of the first pixel.

As the difference between the first frame depth value of the first pixel and the second frame depth value of the first pixel becomes greater, a ratio of the second weight to the first weight may be readjusted to be smaller, and further, to be smaller along a Gaussian curve distribution.

According to yet another aspect of one or more embodiments, there may be provided an image processing method, including calculating a first weight of a first frame depth value of a first pixel of a depth image and a second weight of a second frame depth value of the first pixel, based on a difference between the first frame depth value of the first pixel and the second frame depth value of the first pixel, the first frame depth value of the first pixel and the second frame depth value of the first pixel being among a plurality of frame depth values of the first pixel, and determining a corrected first frame depth value of the first pixel using a linear sum that is calculated by applying the first weight to the first frame depth value of the first pixel, and by applying the second weight to the second frame depth value of the first pixel.

As the difference between the first frame depth value of the first pixel and the second frame depth value of the first pixel becomes greater, a ratio of the second weight to the first weight may be adjusted to be smaller, and further, to be smaller along a Gaussian curve distribution.

According to yet another aspect of one or more embodiments, there may be provided an image processing method, including calculating two weights corresponding to two frame depth values, each weight being based on an obtainment time difference between the two frame depth values, the frame depth values being different frame depth values of a same pixel, and correcting at least one of frame depth values by applying each weight to the corresponding one of the frame depth values.

According to yet another aspect of one or more embodiments, there may be provided a method of correcting frame depth values in a depth image, the method including calculating weights corresponding to different frame depth values of a same pixel in the depth image, each weight being based on a time difference between the different frame depth values, and applying each weight to the corresponding one of the frame depth values.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
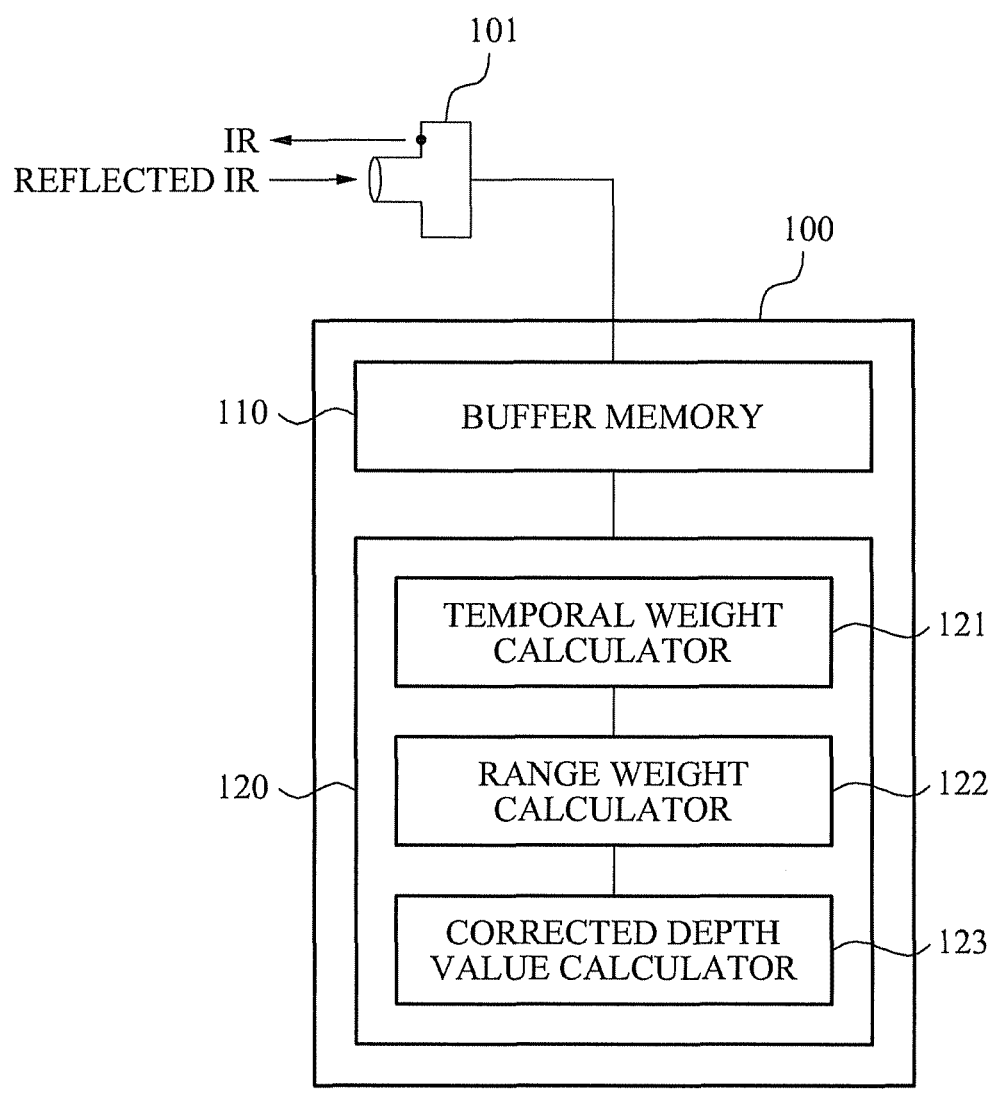
FIG. 1 illustrates a configuration of an image processing apparatus according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of an image processing apparatus 100 according to an embodiment.

The image processing apparatus 100 may receive a plurality of frame depth images or a plurality of frame depth values with respect to a particular pixel that is provided from a depth camera 101, and may store the received plurality of frame depth images or frame depth values in a buffer memory 110.

The image processing apparatus 100 may include a calculation apparatus 120 including a temporal weight calculator 121 to calculate a temporal weight, a range weight calculator 122 to calculate a range weight, and a corrected depth value calculator 123 to calculate a corrected depth value.

To correct a first frame depth value of a first pixel, the temporal weight calculator 121 may calculate the temporal weight to be applied to each of at least one second frame depth values of the first pixel. The temporal weight may be applied based on an obtainment time difference between frames.

When the first frame depth value of the first pixel is d(i, j, t) and the second frame depth value is d(i, j, t−k), the temporal weight calculator 121 may determine a weight to be applied to a second frame as a smaller value as k becomes greater. Here, k denotes a real number and the obtainment time difference between the frames.

According to an embodiment, as k increases, the temporal weight may exponentially decrease. In particular, the temporal weight may decrease along a Gaussian curve distribution. An operation of the temporal weight calculator 121 will be described in detail later with reference to FIG. 5.

To correct the first frame depth value of the first pixel, the range weight calculator 122 may calculate a range weight to be applied to each of at least one second frame depth value of the first pixel. The range value may be applied based on a depth value difference.

According to an embodiment, as a difference between d(i, j, t) and d(i, j, t−k) becomes greater, a range weight ratio may exponentially decrease and may also decrease along the Gaussian curve distribution. A process of calculating, by the range weight calculator 122, the range weight will be further described in detail with reference to FIG. 6.

The corrected depth value calculator 123 may calculate a corrected first frame depth value of the first pixel using a linear sum of the first frame depth value of the first pixel and the at least one second frame depth value of the first pixel by applying the calculated temporal weight and/or range weight.

An operation of the corrected depth value calculator 123 will be described in detail with reference to FIGS. 6 and 7.

Figure 2:
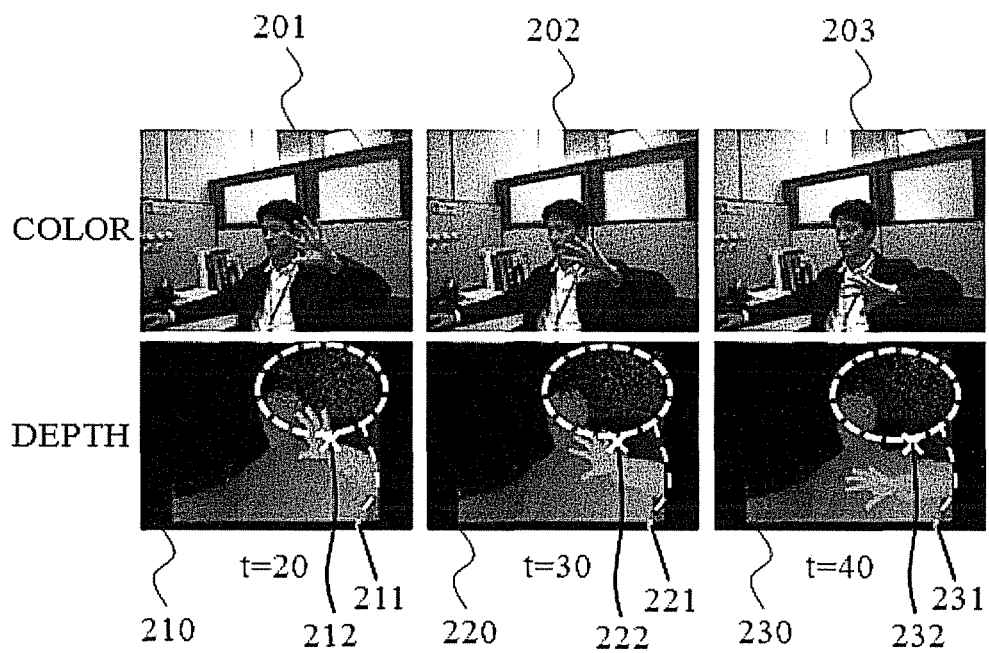
FIG. 2 illustrates depth images of frames that are input into an image processing apparatus according to an embodiment.

FIG. 2 illustrates depth images 210, 220, and 230 of frames that are input into an image processing apparatus according to an embodiment.

Here, it is assumed that the depth image 210 is obtained from an object space corresponding to a color image 201 at t=20, the depth image 220 is obtained from the object space corresponding to a color image 202 at t=30, and the depth image 230 is obtained from the object space corresponding to a color image 203 at t=40.

The depth images 210, 220, and 230 correspond to a plurality of depth image frames that are obtained in different points in times with respect to the same object space.

When comparing an area 211 of the depth image 210, an area 221 of the depth image 220, and an area 231 of the depth image 230, it can be seen that pixels included in the depth images 210, 220, and 230 are affected by noise.

A particular pixel of any one depth image among the plurality of depth images 210, 220, and 230 may be selected. For example, a particular pixel of the depth image 230 may be selected.

Here, it is assumed that a first pixel 232 marked by "X" within the depth image 230 obtained at t=40 is selected. In this case, the first pixel 232 may correspond to a pixel 212 marked by "X" within the depth image 210 obtained at t=20. Also, the first pixel 232 may correspond to a pixel 222 marked by "X" within the depth image 220 obtained at t=30.

Figure 3:
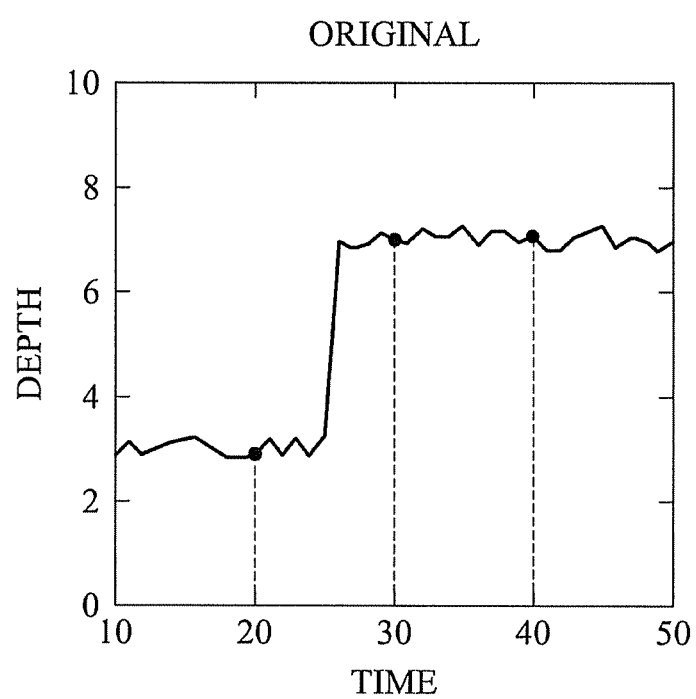
FIG. 3 illustrates a graph plotting a measured depth value of a particular pixel of FIG. 2 that is input into an image processing apparatus according to an embodiment.

An exemplary graph plotting a depth value of the first pixel 232, measured over time, may be shown in FIG. 3.

FIG. 3 illustrates a graph plotting a measured depth value of the first pixel 232 of FIG. 2 that is input into an image processing apparatus according to an embodiment.

In FIG. 3, a horizontal axis denotes a time when a corresponding depth value is measured, and a vertical axis denotes a measured depth value. Accordingly, when observing a pattern of depth values, it is possible to verify a noise affect.

It can be seen from the graph that the depth value significantly increases at around t=25. There is a large difference between depth values corresponding to t<25 and depth values corresponding to t>25. The large difference may be determined to occur due to a motion of an object.

Referring again to FIG. 2, a depth value of the pixel 212 at t=20 corresponds to a hand of a human being that is the object. Since the hand is moved, the pixel 222 at t=30 or the first pixel 232 at t=40 corresponds to a background. Accordingly, in the graph of FIG. 3, the depth value significantly increases at around t=25.

In a conventional art, there is provided a corrected or noise-removed depth image value by simply calculating the average of a plurality of frame depth image values to remove noise in a depth image.

For example, let a current depth value be d(i, j, t). Here, i and j denote a row value and a column vector to identify a particular pixel within a depth image. Also, t denotes a current time.

A conventional average temporal filtering scheme may correct a depth value of a current frame using depth values of a plurality of frames, for example, two frames excluding the current frame.

When depth values of previous frames are expressed by d(i, j, t−k1) and d(i, j, t−k2), the average temporal filtering scheme may calculate a corrected depth value d'(i, j, t) by applying the same weight to the current frame depth value d(i, j, t), and the previous frame depth values d(i, j, t−k1) and d(i, j, t−k2).

Specifically, such a conventional average temporal filtering scheme would be performed in accordance with the following equation: d'(i, j, t)=⅓×(d(i, j, t)+d(i, j, t−k1)+d(i, j, t−k2)).

When the object is in a motionless state, that is, in a static state, the average temporal filtering scheme may relatively excellently remove noise.

However, when the object is in a dynamic state as shown in FIG. 2, blurring may occur between the depth values, whereby the depth values may be distorted. This phenomenon may be referred to as motion blurring.

Figure 4:
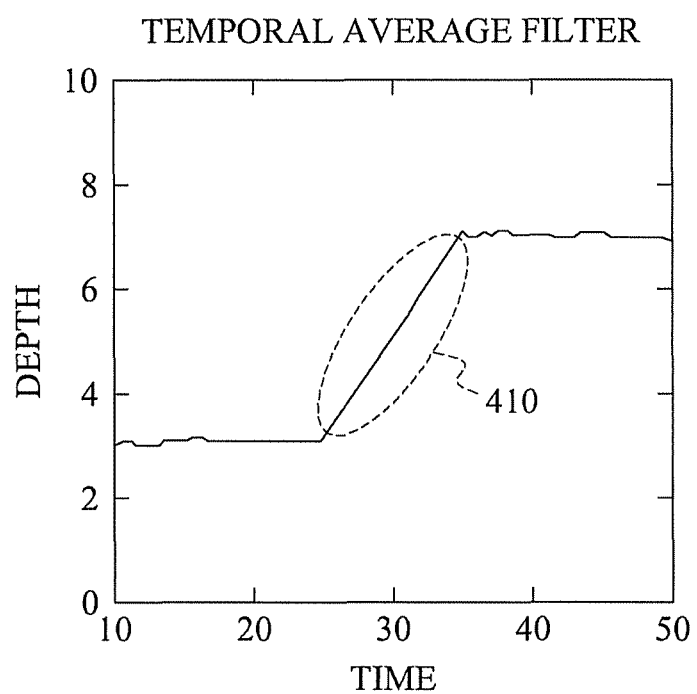
FIG. 4 illustrates a graph plotting a result of processing a depth value corresponding to the graph of FIG. 3 using a conventional temporal average filter.

FIG. 4 illustrates a graph plotting a result of processing a depth value corresponding to the graph of FIG. 3 using a conventional temporal average filter.

It can be seen that motion blurring occurs in a portion 410 of the graph. The temporal average filtering scheme is proposed so that depth values of previous frames are correlated with a depth value of a current frame. However, in FIG. 2, due to a motion of the object at around t=25, there is a significant change in the depth value of the first pixel 232.

The motion blurring phenomenon may frequently occur since the same weight, for example, ⅓ in the above example, is applied to the depth values of the previous frames to be used in a calculation for a noise removal.

According to an embodiment, a different weight may be applied to depth values of previous frames to be used in a calculation for a noise removal.

For example, as a point in time of when a depth value of a previous frame is obtained is temporally further away from a point in time of when the depth value of the current frame is obtained, a smaller weight may be applied. Specifically, it is assumed that, as the obtainment time difference between the frames becomes greater, a correlation is smaller. Hereinafter, the aforementioned scheme is referred to as an adaptive temporal weight or a temporal weight.

The embodiment will be further described in detail with reference to FIG. 5.

Also, as the difference between the depth value of the previous frame and the depth value of the current frame becomes greater, the smaller weight may be applied separately or together with the temporal weight. Specifically, it is assumed that, as the depth value difference becomes greater, the depth value may change due to a change in an actual state of the object, as opposed to a change due to noise. Since the noise is known to have a white Gaussian characteristic, the above assumption may be reasonable.

The embodiment will be further described in detail with reference to FIG. 5.

Figure 5:
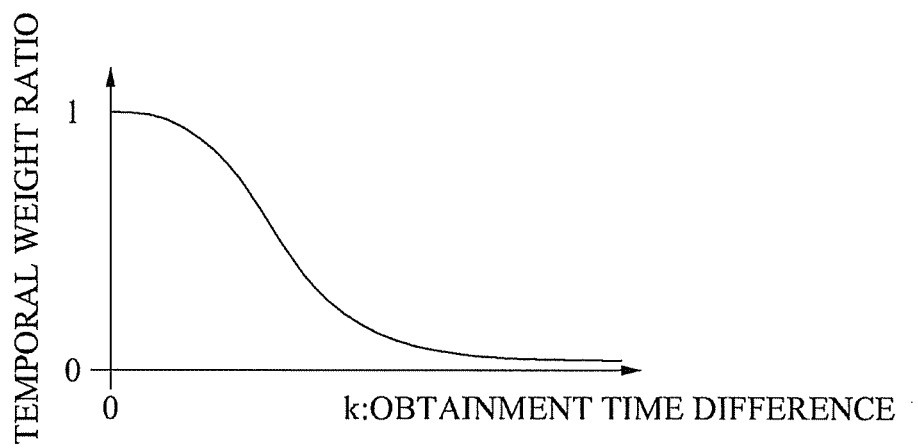
FIG. 5 illustrates a graph plotting a change of a temporal weight with respect to an obtainment time difference between frame depth values according to an embodiment.

FIG. 5 illustrates a graph plotting a change of a temporal weight with respect to an obtainment time difference between frame depth values according to an embodiment.

Here, it is assumed that a current frame depth value of a first pixel is d(i, j, k) and a previous frame depth value of the first pixel is d(i, j, t−k). Here, k denotes a real number and an obtainment time difference between frames.

A smaller weight may be assigned for a previous frame with a greater k. Accordingly, a depth value of a temporally closer frame may be further reflected in the depth value of the first pixel.

In FIG. 5, a horizontal axis denotes the obtainment time difference k, and a vertical axis denotes a temporal weight ratio of a weight of the previous frame depth value to a weight of the current depth value, that is, the temporal weight ratio of a second weight to a first weight.

According to an embodiment, as k increases, the temporal weight ratio may exponentially decrease, and may also decrease along a Gaussian curve distribution. In this case, a weight F(t, t−k) to be applied to the previous frame depth value d(i, j, t−k) may be calculated according to the following Equation 1:

$$F(t, t-k_1) = \exp(-\sigma_t \times k_1^2) / (\Sigma \exp(-\sigma_t \times k_n^2)). \quad \text{Equation 1}$$

Here, $\sigma_t$ denotes an attenuation coefficient that is a positive real number.

Also in this equation, $\Sigma \exp(-\sigma_t \times k_n^2)$ may normalize F(t, t−k) with respect to n frames including the current frame. Accordingly, it is possible to satisfy an equation of $\Sigma(t, t-k) = 1$.

When comparing the above equation 1 with the graph of FIG. 5, the horizontal axis denotes the obtainment time difference k and the vertical axis denotes F(t, t−k).

Figure 6:
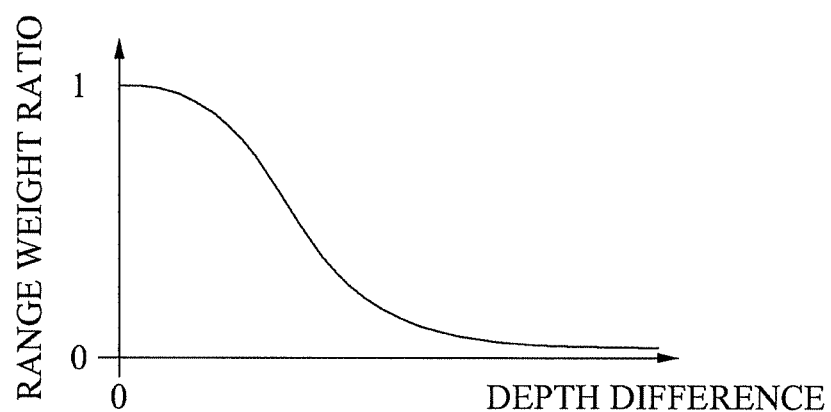
FIG. 6 illustrates a graph plotting a change of a range weight with respect to a difference between frame depth values according to an embodiment.

FIG. 6 illustrates a graph plotting a change of a range weight with respect to a difference between frame depth values according to an embodiment.

As in FIG. 5, it is assumed that a current frame depth value of a first pixel is d(i, j, k) and a previous frame depth value of the first pixel is d(i, j, t−k). Here, k denotes a real number and an obtainment time difference between frames.

According to an embodiment, as a difference between d(i, j, t) and d(i, j, t−k) becomes greater, a range weight ratio may exponentially decrease, and may also decrease along a Gaussian curve distribution. In this case, a weight G(d(i, j, t), d(i, j, t−k)) to be applied to d(i, j, t−k) may be calculated according to the following Equation 2:

$$G(d(i,j,t), d(i,j,t-k_1)) = \exp(-\sigma_R \times (d(i,j,t) - d(i,j,t-k_1))_2) / \Sigma \exp(\sigma_R \times (d(i,j,t) - d(i,j,t-k_n))^2). \quad \text{Equation 2}$$

Here, $\sigma_R$ denotes an attenuation coefficient that is a positive real number. Also here, a denominator $\Sigma \exp(-\sigma_R \times (d(i, j, t) - d(i, j, t-k_n))^2)$ may normalize the weight G(d(i, j, t), d(i, j, t−$k_n$)) with respect to n frames including the current frame. Accordingly, it is possible to satisfy an equation of G(d(i, j, t), d(i, j, t−k)) = 1.

When comparing the above equation with the graph of FIG. 6, the horizontal axis denotes a difference of an obtainment time depth value d(i, j, t)−d(i, j, t−$k_1$), and the vertical axis denotes G(d(i, j, t), d(i, j, t−k)).

According to an embodiment, a final weight may be obtained by multiplying the range weight and the temporal weight. Also, the first pixel value may be calculated by applying either the range weight or the temporal weight.

A corrected depth value of the first pixel may be calculated by applying both the range weight and the temporal weight, as given by the following Equation 3:

$$d'(i, j, t) = \frac{\sum_{k=0}^{n-1} F(t, t-k) G(d(i, j, t), d(i, j, t-k)) d(i, j, t-k)}{\sum_{k=0}^{n-1} F(t, t-k) G(d(i, j, t), d(i, j, t-k))}. \quad \text{Equation 3}$$

Here, d(i, j, t) denotes a before-correction depth value of a first pixel of a first frame that is a current frame, and d'(i, j, t) denotes an after-correction depth value of the first pixel.

Also, d(i, j, t−k) denotes a depth value of a second frame that has an obtainment time difference k with respect to the first frame, F(t, t−k) denotes the temporal weight to be applied to the depth value of the second frame, G(d(i, j, t), d(i, j, t−k)) denotes the range weight to be applied to the depth value of the second frame. The range weight and the temporal weight are described above with reference to the above Equation 1 and Equation 2, and thus further description related thereto will be omitted.

Referring to the above Equation 3, when a new depth value d(i, j, t) is calculated by correcting the first frame depth value d(i, j, t) of the first pixel, it is possible to calculate the corrected depth value based on a linear sum of weighted depth values using another frame depth value, for example, at least one second frame depth value d(i, j, t−k) that is obtained at a different point in time from the first frame depth value.

As the obtainment time difference k between the first frame depth value and the second frame depth value becomes greater, the temporal weight F(t, t−k) to be multiplied by d(i, j, t−k) may be smaller. For example, as in FIG. 5, as k increases, the temporal weight may decrease along the Gaussian curve distribution.

As the first frame depth value d(i, j, t) and the second frame depth, value (i, j, t−k) becomes greater, the range weight G(d(i, j, t), d(i, j, t−k)) to be multiplied by d(i, j, t−k) may be smaller. For example, as in FIG. 6, as k increases, the range weight may decrease along the Gaussian curve distribution.

Figure 7:
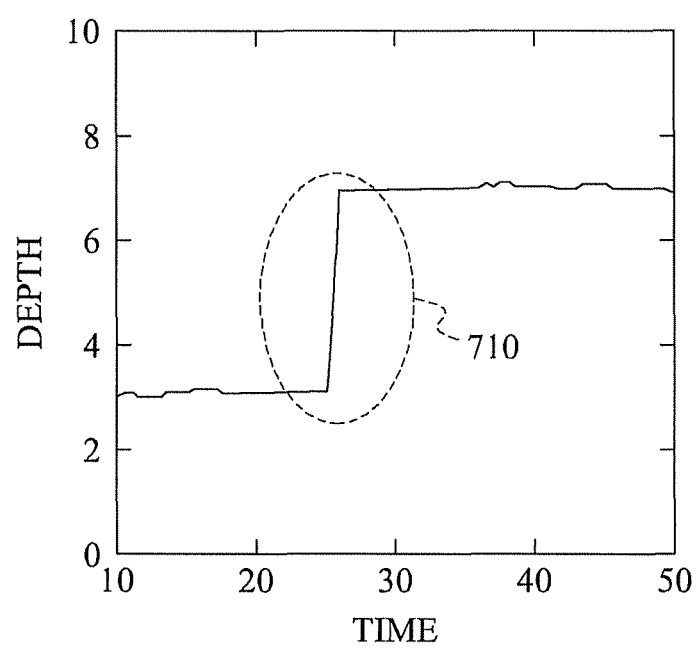
FIG. 7 illustrates a graph plotting a result of processing a depth value corresponding to the graph of FIG. 3 according to an embodiment.

FIG. 7 illustrates a graph plotting a result of processing a depth value corresponding to the graph of FIG. 3 using the above Equation 3 according to an embodiment.

It can be seen from the graph that a corrected depth value of a first pixel shows a smooth characteristic due to decreased noise. It also can be seen that motion blurring significantly decreases at around t=25, that is, in a portion 710 of where a motion of an object changes.

Figure 8:
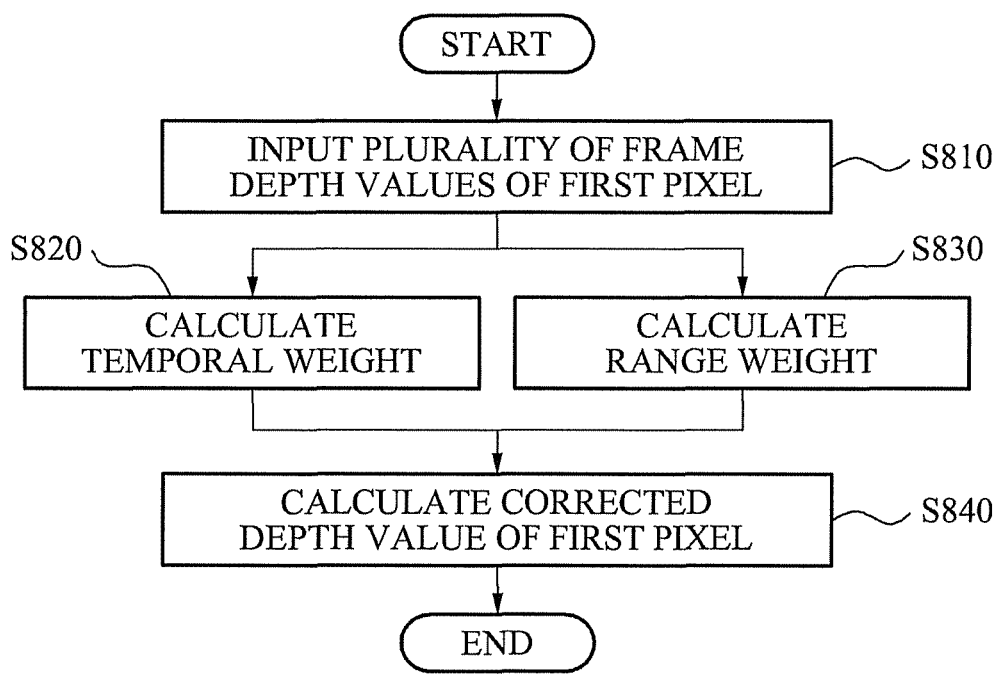
FIG. 8 illustrates a flowchart of an image processing method according to an embodiment.

FIG. 8 illustrates a flowchart of an image processing method according to an embodiment.

In operation S810, a plurality of frame depth values of a first pixel extracted from a plurality of frame depth images obtained from a depth camera may be input into an image processing apparatus.

In operation S820, a temporal weight to be applied to the plurality of frame depth values of the first pixel may be calculated.

The temporal weight may be calculated using the above Equation 1. Also, a first frame depth value of the first pixel may be corrected by applying only the temporal weight.

Also, the first frame depth value of the first pixel may be corrected by applying a range weight instead of the temporal weight, or by applying both the temporal weight and the range weight.

In operation S830, the range weight to be applied to the plurality of frame depth values of the first pixel may be calculated.

The range weight may be calculated using the above Equation 2.

In operation S840, a new depth value that is a corrected first frame depth value of the first pixel may be calculated by applying the calculated temporal weight and/or the range weight. The process of calculating the corrected first frame depth value of the first pixel is described above with reference to the above Equation 3.

According to an embodiment, operations S810 through S840 may be iteratively performed with respect to other pixels within the first frame after operations S810 through S840 are performed with respect to the first pixel.

Even though the above example describes that a noise removal process may be sequentially performed with respect to a plurality of pixels, the noise removal process may be performed in parallel. In this case, a matrix calculation with respect to a depth value may be employed.

The image processing method according to the above-described embodiments may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
   a first calculator to calculate a first weight of a first frame depth value of a first pixel of a first depth image and a second weight of a second frame depth value of the first pixel of a second depth image, based on an obtainment time difference between the first frame depth value of the first pixel and the second frame depth value of the first pixel, the first frame depth value of the first pixel and the second frame depth value of the first pixel being among a plurality of frame depth values of the first pixel; and
   a second calculator to determine a corrected first frame depth value of the first pixel using a linear sum calculated by applying the first weight to the first frame depth value of the first pixel, and by applying the second weight to the second frame depth value of the first pixel,
   wherein the first depth image and the second depth image are from a same depth camera.

2. The image processing apparatus of claim 1, wherein, as the obtainment time difference becomes greater, the first calculator adjusts a difference between the first weight and the second weight to be greater.

3. The image processing apparatus of claim 1, wherein, as the obtainment time difference becomes greater, the first calculator adjusts a ratio of the second weight to the first weight to be smaller.

4. The image processing apparatus of claim 3, wherein, as the obtainment time difference becomes greater, the first calculator adjusts the ratio of the second weight to the first weight to be smaller along a Gaussian curve distribution.

5. The image processing apparatus of claim 1, further comprising:
   a third calculator to readjust the calculated first weight and the second weight based on a difference between the first frame depth value of the first pixel and the second frame depth value of the first pixel,
   wherein the second calculator determines the corrected first frame depth value of the first pixel using a linear value calculated by applying the readjusted first weight to the first frame depth value of the first pixel, and by applying the readjusted second weight to the second frame depth value of the first pixel.

6. The image processing apparatus of claim 5, wherein, as a depth value difference becomes greater, the third calculator adjusts a difference between the first weight and the second weight to be greater.

7. The image processing apparatus of claim 5, wherein, as the difference between the first frame depth value of the first pixel and the second frame depth value of the first pixel becomes greater, the third calculator readjusts a ratio of the second weight to the first weight to be smaller.

8. The image processing apparatus of claim 7, wherein, as the difference between the first frame depth value of the first pixel and the second frame depth value of the first pixel becomes greater, the third calculator readjusts the ratio of the second weight to the first weight to be smaller along a Gaussian curve distribution.

9. An image processing apparatus, comprising:
   a first calculator to calculate a first weight of a first frame depth value of a first pixel of a first depth image and a second weight of a second frame depth value of the first pixel of a second depth image, based on a difference between the first frame depth value of the first pixel and the second frame depth value of the first pixel, the first frame depth value of the first pixel and the second frame depth value of the first pixel being among a plurality of frame depth values of the first pixel; and
   a second calculator to determine a corrected first frame depth value of the first pixel using a linear sum calculated by applying the first weight to the first frame depth value of the first pixel, and by applying the second weight to the second frame depth value of the first pixel,
   wherein the first depth image and the second depth image are from a same depth camera.

10. The image processing apparatus of claim 9, wherein, as a depth value difference becomes greater, the first calculator adjusts a difference between the first weight and the second weight to be greater.

11. The image processing apparatus of claim 9, wherein, as the difference between the first frame depth value of the first pixel and the second frame depth value of the first pixel becomes greater, the first calculator adjusts a ratio of the second weight to the first weight to be smaller.

12. The image processing apparatus of claim 11, wherein, as the difference between the first frame depth value of the first pixel and the second frame depth value of the first pixel becomes greater, the first calculator adjusts the ratio of the second weight to the first weight to be smaller along a Gaussian curve distribution.

13. An image processing method, comprising:
   calculating, by a processor, a first weight of a first frame depth value of a first pixel of a first depth image and a second weight of a second frame depth value of the first pixel of a second depth image, based on an obtainment time difference between the first frame depth value of the first pixel and the second frame depth value of the first pixel, the first frame depth value of the first pixel and the second frame depth value of the first pixel being among a plurality of frame depth values of the first pixel; and determining, by a processor, a corrected first frame depth value of the first pixel using a linear sum calculated by applying the first weight to the first frame depth value of the first pixel, and by applying the second weight to the second frame depth value of the first pixel, wherein the first depth image and the second depth image are from a same depth camera.

14. The image processing method of claim 13, wherein, as the obtainment time difference becomes greater, a ratio of the second weight to the first weight is adjusted to be smaller.

15. The image processing method of claim 14, wherein, as the obtainment time difference becomes greater, the ratio of the second weight to the first weight is adjusted to be smaller along a Gaussian curve distribution.

16. The image processing method of claim 13, further comprising:

readjusting the calculated first weight and the second weight based on a difference between the first frame depth value of the first pixel and the second frame depth value of the first pixel, wherein the determining of the corrected first frame depth value comprises determining the corrected first frame depth value of the first pixel using a linear value calculated by applying the readjusted first weight to the first frame depth value of the first pixel, and by applying the readjusted second weight to the second frame depth value of the first pixel.

17. The image processing method of claim 16, wherein, as the difference between the first frame depth value of the first pixel and the second frame depth value of the first pixel becomes greater, a ratio of the second weight to the first weight is readjusted to be smaller.

18. The image processing method of claim 17, wherein, as the difference between the first frame depth value of the first pixel and the second frame depth value of the first pixel becomes greater, the ratio of the second weight to the first weight is readjusted to be smaller along a Gaussian curve distribution.

19. An image processing method, comprising:

calculating, by a processor, a first weight of a first frame depth value of a first pixel of a first depth image and a second weight of a second frame depth value of the first pixel of a second depth image, based on a difference between the first frame depth value of the first pixel and the second frame depth value of the first pixel, the first frame depth value of the first pixel and the second frame depth value of the first pixel being among a plurality of frame depth values of the first pixel; and determining, by a processor, a corrected first frame depth value of the first pixel using a linear sum calculated by applying the first weight to the first frame depth value of the first pixel, and by applying the second weight to the second frame depth value of the first pixel, wherein the first depth image and the second depth image are from a same depth camera.

20. The image processing method of claim 19, wherein, as the difference between the first frame depth value of the first pixel and the second frame depth value of the first pixel becomes greater, a ratio of the second weight to the first weight is adjusted to be smaller.

21. The image processing method of claim 20, wherein, as the difference between the first frame depth value of the first pixel and the second frame depth value of the first pixel becomes greater, the ratio of the second weight to the first weight is adjusted to be smaller along a Gaussian curve distribution.

22. A non-transitory computer-readable recording medium having stored thereon instructions which, when executed by a processor, cause the processor to execute:

calculating a first weight of a first frame depth value of a first pixel of a first depth image and a second weight of a second frame depth value of the first pixel of a second depth image, based on an obtainment time difference between the first frame depth value of the first pixel and the second frame depth value of the first pixel, the first frame depth value of the first pixel and the second frame depth value of the first pixel being among a plurality of frame depth values of the first pixel; and determining a corrected first frame depth value of the first pixel using a linear sum calculated by applying the first weight to the first frame depth value of the first pixel, and by applying the second weight to the second frame depth value of the first pixel, wherein the first depth image and the second depth image are from a same depth camera.

23. An image processing method, comprising:

calculating, by a processor, two weights corresponding to two frame depth values, respectively, each of the two weights being based on an obtainment time difference between the two frame depth values, the two frame depth values being different frame depth values of a same pixel; and correcting, by a processor, at least one of the two frame depth values by applying each of the two weights to the corresponding one of the two frame depth values, wherein the two frame depth values are for depth frame images from a same depth camera.

24. A method of correcting frame depth values in depth images, the method comprising:

calculating, by a processor, weights corresponding to different frame depth values of a same pixel in different depth images, respectively, each of the weights being based on a time difference between the different frame depth values; and applying, by a processor, each of the weights to the corresponding one of the frame depth values, wherein the two frame depth values are for depth frame images from a same depth camera.

* * * * *